Reissued Dec. 29, 1953 Re. 23,762

UNITED STATES PATENT OFFICE 23,762

METHODS AND COMPOSITIONS FOR CONTROLLING STEM END DECAY OF CITRUS FRUITS

Martin A. Slade, Jr., and Raymond D. Gerwe, Lakeland, Fla., assignors to Food Machinery and Chemical Corporation, San Jose, Calif., a corporation of Delaware No Drawing. Original No. 2,578,752, dated December 18, 1951, Serial No. 59,986, November 13, 1948. Application for reissue December 15, 1952, Serial No. 326,176

6 Claims. (Cl. 99—154)

Matter enclosed in heavy brackets [ ] appears in the original patent but forms no part of this reissue specification; matter printed in italics indicates the additions made by reissue.

This invention relates to the citrus industry and has to do with the commercial preparation of citrus fruits for shipment to market.

One of the problems met with in this industry is the control of destructive diseases to which the fruit is subject in transit from the locale of its production to the market area where it is distributed and consumed. The most common of these diseases are *Penicillium digitatum* and *Penicillium italicum*, which are the well-known blue and green molds. Entirely adequate treatments have been devised for the control of these particular diseases.

In certain localities, however, citrus fruits are subject also to the decay fungi *Diplodia natalensis* and *Phomopsis citri* which attack the fruit through the stem end thereof and thus are known as "Stem End Decay." Prior to the present invention a satisfactory treatment for the control of this type of fungi has been lacking.

It is an object of the present invention to provide a method of and composition for treating citrus fruit whereby the development of stem end decay in this fruit may be effectively retarded.

It is another object to provide such a method and composition which will also effectively retard the development of blue and green mold decay fungi in said fruit.

Previous attempts to provide a treatment for citrus fruit which would constitute an effective control for stem end decay have resulted in the discovery of certain specific agents by which this can be effected; but in each case the agent itself proved toxic to humans and, therefore, could not be used on fruit being prepared for human consumption.

It is a further object of this invention to provide a method of and composition for controlling stem end decay of citrus fruits which will be sufficiently non-toxic to humans for it to qualify for commercial use under the regulations of the Food and Drug Administration.

Additional requirements for a treatment of this kind to be commercially practical are:

1. It must lack any odor which will impart an unpleasant taste to other foods stored with citrus fruits treated therewith.

2. It must not render the fruit unattractive by dulling the surface thereof.

3. It must be applicable rapidly and achieve its effect in a relatively short time.

4. It must be economical to apply.

5. It must be capable of penetrating the stem button area of the fruit in order to gain access to the stem end decay organism, which are located beneath the surface in this particular area.

It is yet another object of this invention to provide a method of and composition for controlling stem end decay in citrus fruits which fulfills all of the foregoing requirements.

After an extensive period of research on this hitherto unsolved problem we discovered that an aqueous solution of salicyl anilide solubilized by the addition thereto of a synthetic organic amine base provides a composition or reaction product meeting all of the foregoing conditions and having the capacity of providing a very high degree of control of stem end decay in citrus fruits. Among the organic amine bases found suitable as a solubilizer for the salicyl anilide in the method of our invention are amino methyl propanol, monoethanolamine, diethanolamine, triethanolamine, morpholine, aminobutanol, and die-ethylamine. The most effective of these compounds in the present process are amino methyl propanol and triethanolamine.

With a one per cent aqueous solution of equal quantities of salicyl anilide and amino methyl propanol, a control of 90 to 100% of stem end decay, as well as blue and green mold decay, is obtained. Decreasing the strength of the salicyl anilide in the solution to .25% progressively decreases the control to around 70%.

In the application of the composition to the fruit the latter is preferably immersed therein just long enough to insure the complete wetting of the entire surface. It is preferable to then allow the fruit to dry naturally in the open air, as the degree of control is increased by the length of time thus afforded for the solution to remain in contact with the stem portions of the fruit.

The period over which contact is required for full effectiveness may be reduced by the addition to the solution of a suitable wetting agent such as Triton X100. When equal parts of salicyl anilide and amine base are employed in the solution, the proportion by weight of the wetting agent to the salicyl anilide will be as one is to ten.

While the maximum economy with full effectiveness of this composition is attained with 1% of salicyl anilide and 1% of amino methyl propanol, the proportion of the amine base may be varied without substantially altering the percentage of control of stem end decay effected by said composition. The ranges within which the proportion of various amine bases to the salicyl anilide may be varied in said composition without adverse effect are as follows:

Salicyl anilide, one part
Amino methyl propanol, not less than one part nor more than four
Monoethanolamine, not less than one part nor more than four
Triethanolamine, not less than two parts nor more than seven
Aminobutanol, not less than one part nor more than four
Morpholine, not less than two parts nor more than five
Di-ethylamine, not less than one part nor more than four We have found that the pH of said composition should be from about 9.5 to about 11.0. When using the correct amounts of the synthetic organic amine bases as above indicated in making up said composition, the latter will have a pH within the stated range.

Other solubilizing agents for the salicyl anilide than those above identified have been tried but proved for one reason or another to be unsuitable by failing to meet one or more of the requirements stated at the outset. Ammonia, caustic potash or caustic soda may be used in place of the synthetic organic amine base, but the percentage of salicyl anilide required to obtain even a fair degree of effectiveness in controlling decay when using these agents renders them out of the question for practical commercial use. In the case of ammonia, an objectionable dull, powdery film is also left on the fruit.

Only when solubilizing the salicyl anilide with a synthetic organic amine base are the amounts of these two agents in the composition sufficiently small when said composition is at its maximum effectiveness to render the cost of treatment low enough to be commercially practical.

We have found that considerable latitude is allowable in the application of the composition of our invention in fitting this into existing packing house operations. For instance, the fruit can be dipped in a treating bath of said composition or be sprayed or flooded therewith immediately before placing the fruit in storage or in the ethylene coloring rooms. On the other hand, the fruit may be contacted by said composition just before washing, but the treatment is not quite as effective as where the treating solution is permitted to remain on the fruit for a longer time before it is disturbed.

Where fruit is dipped in a water wax emulsion and the latter allowed to dry on the fruit as the final step in preparing the fruit for packing, the composition of this invention may be embodied with said emulsion so that it dries on the fruit with the emulsion, thereby giving it an excellent opportunity to penetrate the button and the stem tissue of the fruit.

While it is generally preferable to apply a fungicide solution to fruit in the first contact the fruit has with liquid in the packing house, we have found the present process entirely successful when applying the same to the fruit after it has been washed, rinsed and drained and just before it is dried, polished and waxed in the usual manner.

We claim:

1. The method of treating fresh whole citrus fruit to control stem end decay which comprises contacting said fruit with an aqueous solution of salicyl anilide solubilized with an organic amine base selected from the group comprising amino methyl propanol, monoethanolamine, diethanolamine, triethanolamine, morpholine, aminobutanol and di-ethylamine.

2. The method of treating fresh whole citrus fruit to control stem end decay which comprises contacting said fruit with an aqueous solution of salicyl anilide solubilized with amino methyl propanol.

3. The method of treating fresh whole citrus fruit to control stem end decay which comprises contacting said fruit with an aqueous solution of salicyl anilide solubilized with triethanolamine.

4. The method of treating fresh whole citrus fruit to control stem end decay which comprises contacting said fruit with an aqueous solution of the reaction product of salicyl anilide and an organic amine base selected from the group comprising amino methyl propanol, monoethanolamine, diethanolamine, triethanolamine, morpholine, aminobutanol, and di-ethylamine.

5. *A composition of matter for inhibiting decay in citrus fruits which comprises an aqueous solution of salicyl anilide solubilized with an organic amine base selected from the group comprising amino methyl propanol, monoethanolamine, diethanolamine, triethanolamine, morpholine, aminobutanol and di-ethylamine.*

6. *A composition of matter for inhibiting decay in citrus fruits which comprises the reaction product of salicyl anilide and an organic amine base selected from the group comprising amino methyl propanol, monoethanolamine, diethanolamine, triethanolamine, morpholine, aminobutanol and di-ethylamine.*

MARTIN A. SLADE, JR.
RAYMOND D. GERWE.

References Cited in the file of this patent or the original patent

UNITED STATES PATENTS

| Number | Name | Date |
|---|---|---|
| 2,430,576 | Littler | Nov. 11, 1947 |
| 2,460,710 | Nolan et al. | Feb. 1, 1949 |

OTHER REFERENCES

Magee: Chem. Abstracts, vol. 36, page 3615 (1942).

Beeler: Bulletin of the National Formulary Committee, vol. X, No. 8–9, August-September 1942, pages 179, 180, 213, 214 and 220.